United States Patent
Marshall et al.

(10) Patent No.: US 12,408,692 B2
(45) Date of Patent: *Sep. 9, 2025

(54) SMOKELESS TOBACCO PASTILLE

(71) Applicant: R.J. Reynolds Tobacco Company, Winston-Salem, NC (US)

(72) Inventors: Jerry Wayne Marshall, Stokesdale, CA (US); Daniel Verdin Cantrell, Lewisville, NC (US); Serban C. Moldoveanu, Winston-Salem, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/760,748

(22) Filed: Jul. 1, 2024

(65) Prior Publication Data
US 2024/0349775 A1 Oct. 24, 2024

Related U.S. Application Data

(63) Continuation of application No. 18/076,827, filed on Dec. 7, 2022, now Pat. No. 12,048,321, which is a continuation of application No. 17/200,341, filed on Mar. 12, 2021, now Pat. No. 11,540,555, which is a continuation of application No. 16/748,530, filed on Jan. 21, 2020, now Pat. No. 10,980,271, which is a continuation of application No. 16/440,646, filed on Jun. 13, 2019, now Pat. No. 10,568,355, which is a continuation of application No. 14/055,449, filed on Oct. 16, 2013, now Pat. No. 10,357,054.

(51) Int. Cl.
A24B 13/00 (2006.01)
A23G 3/48 (2006.01)
A24B 15/28 (2006.01)

(52) U.S. Cl.
CPC ............. *A24B 13/00* (2013.01); *A23G 3/48* (2013.01); *A24B 15/28* (2013.01)

(58) Field of Classification Search
None
See application file for complete search history.

(56) References Cited

U.S. PATENT DOCUMENTS

| | | |
|---|---|---|
| 1,376,586 A | 5/1921 | Schwartz |
| 3,098,492 A | 7/1963 | Wurzburg et al. |
| 3,806,617 A | 4/1974 | Smylie |
| 4,267,847 A | 5/1981 | Reid |
| 4,289,147 A | 9/1981 | Wildman et al. |
| 4,351,346 A | 9/1982 | Brummer et al. |
| 4,359,059 A | 11/1982 | Brummer et al. |
| 4,506,682 A | 3/1985 | Muller |
| 4,513,756 A | 4/1985 | Pittman et al. |
| 4,528,993 A | 7/1985 | Sensabaugh, Jr. et al. |
| 4,605,016 A | 8/1986 | Soga et al. |
| 4,624,269 A | 11/1986 | Story et al. |
| 4,660,577 A | 4/1987 | Sensabaugh et al. |
| 4,696,315 A | 9/1987 | Summers |
| 4,725,440 A | 2/1988 | Ridgway et al. |
| 4,727,889 A | 3/1988 | Niven, Jr. et al. |
| 4,880,018 A | 11/1989 | Graves, Jr. et al. |
| 4,887,618 A | 12/1989 | Bernasek et al. |
| 4,941,484 A | 7/1990 | Clapp et al. |
| 4,967,771 A | 11/1990 | Fagg et al. |
| 4,967,773 A | 11/1990 | Shaw |
| 4,986,286 A | 1/1991 | Roberts et al. |
| 4,987,907 A | 1/1991 | Townend |
| 4,989,620 A | 2/1991 | Keritsis et al. |
| 4,991,599 A | 2/1991 | Tibbetts |
| 5,005,593 A | 4/1991 | Fagg |
| 5,018,540 A | 5/1991 | Grubbs et al. |
| 5,060,669 A | 10/1991 | White et al. |
| 5,065,775 A | 11/1991 | Fagg |
| 5,074,319 A | 12/1991 | White et al. |
| 5,092,352 A | 3/1992 | Sprinkle, III et al. |
| 5,099,862 A | 3/1992 | White et al. |
| 5,121,757 A | 6/1992 | White et al. |
| 5,131,414 A | 7/1992 | Fagg et al. |
| 5,131,415 A | 7/1992 | Munoz et al. |
| 5,148,819 A | 9/1992 | Fagg |

(Continued)

FOREIGN PATENT DOCUMENTS

| | | |
|---|---|---|
| WO | WO 03/055486 | 7/2003 |
| WO | WO 2004/095959 | 11/2004 |

(Continued)

OTHER PUBLICATIONS

Anand et al., "Curcumin and Cancer: An "old-age" Disease With an "age-old" Solution," *Cancer Letters*, 2008, vol. 267, pp. 133-164. www.curcuminesearch.org/.

Bureenok et al., "Additive Effects of Green Tea on Fermented Juice of Epiphytic Lactic Acid Bacteria (FJLB) and the Fermentative Quality of rhodesgrass Silage," *Asian-Aust. J. anim. Sci.*, 2007, vol. 20, No. 6, pp. 920-924. www.ajas.info/Edito/manuscript/upload/20-129.pdf.

Cerella et al., "Natural Compounds as Regulators of the Cancer Cell Metalbolism," *International Journal of Cell Biology*, vol. 2013 (2013), Article ID 639401, 16 pages, http://www.hindawi.com/journals/ijcb/2013/639401.

(Continued)

*Primary Examiner* — Cynthia Szewczyk
(74) *Attorney, Agent, or Firm* — Womble Bond Dickinson (US) LLP

(57) ABSTRACT

A smokeless tobacco pastille configured for insertion into the mouth of a user is provided. The smokeless tobacco pastille can include (i) a tobacco material present in an amount of less than about 40 dry weight percent, based on the total dry weight of the pastille; (ii) at least one natural gum binder present in an amount of at least about 25 dry weight percent; and (iii) a plurality of sugar alcohols present in a total amount of at least about 40 dry weight percent, the predominant component of the plurality of sugar alcohols being isomalt or erythritol, wherein the shape of the smokeless tobacco pastille is moldable in the oral cavity.

20 Claims, No Drawings

(56) References Cited

U.S. PATENT DOCUMENTS

| | | |
|---|---|---|
| 5,167,244 A | 12/1992 | Kjerstad |
| 5,197,494 A | 3/1993 | Kramer |
| 5,230,354 A | 7/1993 | Smith et al. |
| 5,234,008 A | 8/1993 | Fagg |
| 5,243,999 A | 9/1993 | Smith |
| 5,301,694 A | 4/1994 | Raymond et al. |
| 5,318,050 A | 6/1994 | Gonzalez-Parra et al. |
| 5,343,879 A | 9/1994 | Teague |
| 5,360,022 A | 11/1994 | Newton et al. |
| 5,387,416 A | 2/1995 | White et al. |
| 5,435,325 A | 7/1995 | Clapp et al. |
| 5,445,169 A | 8/1995 | Brinkley et al. |
| 5,733,574 A | 3/1998 | Dam |
| 5,829,453 A | 11/1998 | White et al. |
| 5,844,119 A | 12/1998 | Weigel |
| 6,077,524 A | 6/2000 | Bolder et al. |
| 6,138,683 A | 10/2000 | Hersh et al. |
| 6,162,516 A | 12/2000 | Derr |
| 6,182,670 B1 | 2/2001 | White et al. |
| 6,248,760 B1 | 6/2001 | Wilhelmsen |
| 6,280,761 B1 | 8/2001 | Santus |
| 6,284,875 B1 | 9/2001 | Turpen et al. |
| 6,298,859 B1 | 10/2001 | Kierulff et al. |
| 6,668,839 B2 | 12/2003 | Williams |
| 6,676,959 B1 | 1/2004 | Andersson et al. |
| 6,730,832 B1 | 5/2004 | Dominguez et al. |
| 6,772,767 B2 | 8/2004 | Mua et al. |
| 6,834,654 B2 | 12/2004 | Williams |
| 6,845,777 B2 | 1/2005 | Pera |
| 6,887,307 B1 | 5/2005 | Scott et al. |
| 6,895,974 B2 | 5/2005 | Peele |
| 6,906,172 B2 | 6/2005 | Bratcher et al. |
| 6,923,981 B2 | 8/2005 | Leung et al. |
| 6,953,040 B2 | 10/2005 | Atchley et al. |
| 7,025,066 B2 | 4/2006 | Lawson et al. |
| 7,032,601 B2 | 4/2006 | Atchley et al. |
| 7,034,128 B2 | 4/2006 | Turpen et al. |
| 7,048,211 B2 | 5/2006 | Bratcher et al. |
| 7,173,170 B2 | 2/2007 | Liu et al. |
| 7,208,659 B2 | 4/2007 | Colliver et al. |
| 7,230,160 B2 | 6/2007 | Benning et al. |
| 7,337,782 B2 | 3/2008 | Thompson |
| 7,374,779 B2 | 5/2008 | Chen et al. |
| 7,650,892 B1 | 1/2010 | Groves et al. |
| 7,694,686 B2 | 4/2010 | Atchley et al. |
| 7,819,124 B2 | 10/2010 | Strickland et al. |
| 7,861,728 B2 | 1/2011 | Holton, Jr. et al. |
| 7,946,295 B2 | 5/2011 | Brinkley et al. |
| 8,067,046 B2 | 11/2011 | Schleef et al. |
| 8,168,855 B2 | 5/2012 | Neilsen et al. |
| 8,434,496 B2 | 5/2013 | Chen et al. |
| 2001/0016593 A1 | 8/2001 | Wilhelmsen |
| 2004/0020503 A1 | 2/2004 | Williams |
| 2004/0101543 A1 | 5/2004 | Liu et al. |
| 2004/0118422 A1 | 6/2004 | Lundin et al. |
| 2004/0191322 A1 | 9/2004 | Hansson |
| 2005/0061339 A1 | 3/2005 | Hansson et al. |
| 2005/0115580 A1 | 6/2005 | Quinter et al. |
| 2005/0244521 A1 | 11/2005 | Strickland et al. |
| 2006/0037623 A1 | 2/2006 | Lawrence, Jr. |
| 2006/0120974 A1 | 6/2006 | Mcneight |
| 2006/0191548 A1 | 8/2006 | Strickland et al. |
| 2006/0198873 A1 | 9/2006 | Chan et al. |
| 2006/0236434 A1 | 10/2006 | Conkling et al. |
| 2007/0062549 A1 | 3/2007 | Holton, Jr. et al. |
| 2008/0020050 A1 | 1/2008 | Chau et al. |
| 2008/0029110 A1 | 2/2008 | Dube et al. |
| 2008/0029116 A1 | 2/2008 | Robinson et al. |
| 2008/0029117 A1 | 2/2008 | Mua et al. |
| 2008/0173317 A1 | 7/2008 | Robinson et al. |
| 2008/0196730 A1 | 8/2008 | Engstrom et al. |
| 2008/0245377 A1 | 10/2008 | Marshall et al. |
| 2008/0260807 A1 | 10/2008 | Sharp et al. |
| 2008/0286341 A1 | 11/2008 | Andersson et al. |
| 2008/0305216 A1 | 12/2008 | Crawford et al. |
| 2009/0014343 A1 | 1/2009 | Clark et al. |
| 2009/0014450 A1 | 1/2009 | Bjorkholm |
| 2009/0025738 A1 | 1/2009 | Mua et al. |
| 2009/0065013 A1 | 3/2009 | Essen et al. |
| 2009/0081291 A1 | 3/2009 | Gin et al. |
| 2009/0223989 A1 | 9/2009 | Gelardi |
| 2009/0230003 A1 | 9/2009 | Thiellier |
| 2009/0250360 A1 | 10/2009 | Bellamah et al. |
| 2009/0266837 A1 | 10/2009 | Gelardi et al. |
| 2009/0293889 A1 | 12/2009 | Kumar et al. |
| 2009/0293895 A1 | 12/2009 | Axelsson et al. |
| 2010/0004294 A1 | 1/2010 | Axelsson et al. |
| 2010/0018883 A1 | 1/2010 | Patel |
| 2010/0063110 A1 | 3/2010 | Meyer et al. |
| 2010/0084424 A1 | 4/2010 | Gelardi |
| 2010/0133140 A1 | 6/2010 | Bailey et al. |
| 2010/0260690 A1 | 10/2010 | Kristensen et al. |
| 2010/0282267 A1 | 11/2010 | Atchley |
| 2010/0291245 A1 | 11/2010 | Gao et al. |
| 2010/0300464 A1 | 12/2010 | Gee et al. |
| 2010/0303969 A1 | 12/2010 | Sengupta et al. |
| 2011/0139164 A1 | 6/2011 | Mua et al. |
| 2011/0214681 A1 | 9/2011 | Axelsson et al. |
| 2011/0220130 A1 | 9/2011 | Mua et al. |
| 2011/0247640 A1 | 10/2011 | Beeson et al. |
| 2011/0268809 A1 | 11/2011 | Brinkley et al. |
| 2011/0303511 A1 | 12/2011 | Brinkley et al. |
| 2012/0024301 A1 | 2/2012 | Carroll et al. |
| 2012/0037175 A1 | 2/2012 | Cantrell et al. |
| 2012/0055494 A1 | 3/2012 | Hunt et al. |
| 2012/0118310 A1 | 5/2012 | Cantrell et al. |
| 2012/0138073 A1 | 6/2012 | Cantrell et al. |
| 2012/0138074 A1 | 6/2012 | Cantrell et al. |
| 2012/0145170 A1 | 6/2012 | O'Connell |
| 2012/0199145 A1 | 8/2012 | Byrd et al. |
| 2012/0272976 A1 | 11/2012 | Byrd et al. |
| 2013/0074855 A1 | 3/2013 | Holton, Jr. |
| 2013/0078307 A1 | 3/2013 | Holton, Jr. et al. |
| 2013/0098377 A1 | 4/2013 | Borschke et al. |
| 2013/0118512 A1 | 5/2013 | Jackson et al. |
| 2013/0125904 A1 | 5/2013 | Chen et al. |
| 2013/0152953 A1 | 6/2013 | Mua et al. |
| 2013/0186418 A1 | 7/2013 | Gao et al. |
| 2013/0186419 A1 | 7/2013 | Gao et al. |
| 2013/0206150 A1 | 8/2013 | Duggins et al. |
| 2013/0206153 A1 | 8/2013 | Beeson et al. |
| 2013/0209540 A1 | 8/2013 | Duggins et al. |
| 2013/0263870 A1 | 10/2013 | Cantrell et al. |
| 2013/0274296 A1 | 10/2013 | Jackson et al. |
| 2013/0340773 A1 | 12/2013 | Sebastian et al. |
| 2015/0068545 A1 | 3/2015 | Moldoveanu et al. |

FOREIGN PATENT DOCUMENTS

| | | |
|---|---|---|
| WO | WO 2009/015142 | 1/2009 |
| WO | WO 2009/141321 | 11/2009 |
| WO | WO 2012/075035 | 6/2012 |

OTHER PUBLICATIONS

Clark et al., "Curcumin Inhibits Carcinogen and Nicotine-Induced Mammalian Target of Rapamycin Pathway Activation in Head and Neck Squamous Cell Carcinoma," *Cancer Prevention Research*, 2010, vol. 3(12), pp. 1586-1595. http://cancerpreventionresearch.aacrjournals.org/content/3/12/1586.short.

Dalzell, LFRA Ingredients Handbook, Sweeteners, Leatherhead Food RA, Dec. 1996, pp. 21-44, http://firatozel.files.wordpress.com/2011/08/essential_guide_to_food_additives.pdf.

Danebower, et al. "Tobacco as a Biochemical Resource: Past, Present, and Future" Biologically Active Natural Products: Agrochemicals, pp. 155-168.

Khafif et al., "Quantitation of Chemopreventive Synergism Between (−)-epigallocatechin-3-gallate and curcumin in normal, premalignant and Malignant Human Oral Epithelial Cells," *Carcinogenesis*, 1998, pp. 419-424, vol. 19, No. 3. http://carcin.oxfordjournals.org/content/19/3/419.

Kokotkiewicz et al., "Honeybush (*Cyclopia* sp.)—A rich Source of Compounds with High Antimutagenic Properties," *Fitoterapia*, 2009, pp. 3-11, vol. 80.

(56) References Cited

OTHER PUBLICATIONS

Kokotkiewicz et al., "In Vitro cultures of *Cyclopia* Plants (Honeybush) as a Source of Bioactive Xanthones andFlavanones," *Z. Naturforsch*, 2009, pp. 533-540, www.znaturforsch.com/rc/s64c0533.pdf.

Lu et al., "Enzymatic Tannase Treatment of Green Tea Increases in vitro Inhibitory Activity Against N-nitrosation ofDimethylamine," *Process Biochemistry*, 2007, pp. 1285-1290, vol. 42.

Nestor, et al. "Role of Oxides of Nitrogen in Tobacco-Specific Nitrosamine Formation in Flue-Cured Tobacco",Beitrage zur Tabakforschung International/Contributions to Tobacco Research, Nov. 2003, pp. 467-475, vol. 20 No. 7.

Puangsombat et al, "Inhibitory Activity of Asian Spices on Heterocyclic Amines Formation in Cooked BeefPaties," *J. Food Science*, Oct. 2011, vol. 76, No. 8., http://www.ncbi.nlm.nih.gov/pubmed/21913920.

Rinaldi et al., "Curcumin Activates the Aryl Hydrocarbon Receptor Yet Significantly Inhibits (−)-Benzo(a)pyrene-7R-trans-7,8-dihydrodiol Bioactivation in Oral Squamous Cell Carcinoma Cells and Oral Mucosa," *Cancer Research*, 2002; 62:5451-5456, http://cancerres.aacrjournals.org/content/62/19/5451.long.

Santhosh et al., "Potent Suppressive Effect of Green Tea Polyphenols on Tobacco-Induced Mutagenicity," *Phytomedicine*, 2005, pp. 216-220, vol. 12.

South African Rooibos Council, "The Science Behind Rooibos—South Africa's Unique and Healthy Herbal Tea," Rooibos Research, Jul. 2013, pp. 1-6, www.sarooibos.co.za/images/the-science-behind-rooibos-july2013.pdf.

"Opinion of the Scientific Panel on Food Additives, Flavourings, Processing Aids and Materials in Contact with Food on a request from the Commission related to . . . " The EFSA Journal, 2004, pp. 1-32, vol. 85.

Wikipedia: Definition of "Ilex Guayusa", www.en.wikipedia.org/wiki/ilex_guayusa-.

SMOKELESS TOBACCO PASTILLE

This application is a continuation of U.S. application Ser. No. 18/076,827, filed Dec. 7, 2022, which is a continuation of U.S. application Ser. No. 17/200,341, filed on Mar. 12, 2021, which is a continuation of U.S. application Ser. No. 16/748,530, filed on Jan. 21, 2020, which is a continuation of U.S. application Ser. No. 16/440,646, filed on Jun. 13, 2019, which is a continuation of U.S. application Ser. No. 14/055,449, filed on Oct. 16, 2013, which applications are hereby incorporated by reference in their entirety in this application.

FIELD OF THE DISCLOSURE

The present disclosure relates to products made or derived from tobacco, or that otherwise incorporate tobacco, and are intended for human consumption. In particular, the invention relates to smokeless tobacco products containing ingredients or components obtained or derived from plants of the *Nicotiana* species.

BACKGROUND OF THE DISCLOSURE

Cigarettes, cigars and pipes are popular smoking articles that employ tobacco in various forms. For example, a traditional type of cigarette has a substantially cylindrical rod-shaped structure and includes a charge, roll or column of smokable material, such as shredded tobacco (e.g., in cut filler form), surrounded by a paper wrapper, thereby forming a so-called "smokable rod", "tobacco rod" or "cigarette rod." Tobacco also may be enjoyed in a so-called smokeless form. Particularly popular smokeless tobacco products are employed by inserting some form of processed tobacco or tobacco-containing formulation into the mouth of the user. See for example, the types of representative smokeless tobacco products, as well as the various smokeless tobacco formulations, ingredients and processing methodologies, referenced in the background art set forth in U.S. Pat. Pub. Nos. 2011/0303511 to Brinkley et al. and 2013/0206150 to Duggins et al.; which are incorporated herein by reference.

It would be desirable to provide an enjoyable form of a tobacco product, such as a smokeless tobacco product, and to provide processes for preparing tobacco-containing compositions suitable for use in smokeless tobacco products.

SUMMARY OF THE DISCLOSURE

The present disclosure relates to a dissolvable smokeless tobacco pastille product configured for insertion into the mouth of a user and processes for preparing a smokeless tobacco composition suitable for use in a smokeless tobacco product. The smokeless tobacco composition of the disclosure provides a dissolvable smokeless tobacco product having a lightly chewable quality and is typically soft and flexible enough to be moldable in the mouth by the user. In certain embodiments, the pastille of the invention utilizes tobacco material in the form of an extract (e.g., an aqueous extract) or in the form of finely-milled tobacco particles, such as particles with an average particle size of less than about 50 microns.

In one aspect, the invention provides a smokeless tobacco pastille configured for insertion into the mouth of a user, the smokeless tobacco pastille comprising: (i) a tobacco material present in an amount of less than about 40 dry weight percent, based on the total dry weight of the pastille; (ii) at least one natural gum binder present in an amount of at least about 25 dry weight percent; and (iii) a plurality of sugar alcohols present in a total amount of at least about 40 dry weight percent, the predominant component of the plurality of sugar alcohols being isomalt or erythritol, wherein the shape of the smokeless tobacco pastille is moldable in the oral cavity.

The tobacco material in the product can vary. In certain embodiments, the only tobacco material present in the pastille is in the form of one or more tobacco extracts (e.g., aqueous extracts), and those extracts are typically present in amount of less than about 10 dry weight percent. The tobacco extract can be in the form of pharmaceutical grade nicotine. In other embodiments, the tobacco material comprises a particulate tobacco material (such as finely milled tobacco particles) present in an amount of less than about 12 dry weight percent. In addition to tobacco, the pastille can further include a non-tobacco botanical component, and typically the total amount of tobacco material and non-tobacco botanical component remains less than about 40 dry weight percent. Exemplary non-tobacco botanical components include rosemary, oregano, sage, hibiscus, clove, rose hip, yerba mate, cocoa, turmeric, guayusa, honeybush, green tea, black tea, rooibos, and combinations thereof.

In certain embodiments, the smokeless tobacco pastille includes one or more of green tea, guayusa, rooibos, or honeybush in an amount sufficient to impart certain desirable sensory characteristics to the product. Exemplary amounts include green tea, guayusa, rooibos, or honeybush present as an aqueous extract in an amount of about 1 to about 5 dry weight percent, or in the form of a powder in an amount of about 5 to about 10 dry weight percent.

The natural gum binder is typically gum arabic; however, other natural gums could also be used such as xanthan gum, guar gum, ghatti gum, gum tragacanth, karaya gum, locust bean gum, gellan gum, and combinations thereof. The natural gum binder is typically present in an amount of about 25 to about 40 dry weight percent.

The plurality of sugar alcohols, in addition to isomalt (or erythritol), can include one or more different sugar alcohols selected from the group consisting of erythritol, arabitol, ribitol, polyglycitol, maltitol, dulcitol, iditol, mannitol, xylitol, lactitol, sorbitol, and combinations thereof. Typically, the isomalt or erythritol comprises at least about 75% of the total dry weight of the plurality of sugar alcohols. In certain embodiments, the plurality of sugar alcohols comprises at least two additional sugar alcohols in addition to the predominant component, such as two additional sugar alcohols present in a dry weight ratio of at least about 3:1. In one embodiment, erythritol or sorbitol and either maltitol or xylitol are present in a dry weight ratio of at least about 3:1, with erythritol or sorbitol being the larger component. Where erythritol is the predominant component of the sugar alcohols instead of isomalt, isomalt can be substituted for erythritol as the larger component of the two additional sugar alcohols.

In addition to the ingredients noted above, other components can be added to the pastille formulation such as flavorants, sweeteners (e.g., sucralose), additional binders, emulsifiers, disintegration aids, humectants (e.g., glycerin), colorants, buffering agents, and mixtures thereof. Further, the pastille of the invention can include an outer coating and can be starch-moulded as described herein.

In one particular embodiment, the smokeless tobacco pastille comprises:

(i) at least one solid particulate component, in the form of tobacco particles or non-tobacco botanical particles or both, the particulate component present in an amount of at least about 5 dry weight percent;
(ii) a natural gum binder present in an amount of at least about 25 dry weight percent;
(iii) a plurality of sugar alcohols present in an amount of at least about 40 dry weight percent, the plurality of sugar alcohols including isomalt or erythritol in an amount of at least about 75% of the total dry weight of sugar alcohols;
(iv) salt present in an amount of at least about 4 dry weight percent; and
(v) a humectant in an amount of at least about 1 dry weight percent. The pastille may further include a tobacco extract or non-tobacco botanical extract present in an amount of at least about 0.1 dry weight percent.

In another embodiment, the smokeless tobacco pastille comprises:
(i) at least one aqueous tobacco extract or other aqueous non-tobacco botanical extract or both, the extract component present in an amount of at least about 1 dry weight percent;
(ii) a natural gum binder present in an amount of at least about 30 dry weight percent;
(iii) a plurality of sugar alcohols present in an amount of at least about 45 dry weight percent, the plurality of sugar alcohols including isomalt or erythritol in an amount of at least about 75% of the total dry weight of sugar alcohols;
(iv) salt present in an amount of less than about 4 dry weight percent; and
(v) a humectant in an amount of at least about 1 dry weight percent. In this embodiment, it is typical not to include any solid, non-dissolvable components (such as particulate tobacco) in the formulation and instead use only aqueous-soluble components.

DETAILED DESCRIPTION OF THE INVENTION

The present disclosure now will be described more fully hereinafter. The disclosure may be embodied in many different forms and should not be construed as limited to the aspects set forth herein; rather, these aspects are provided so that this disclosure will satisfy applicable legal requirements. As used in this specification and the claims, the singular forms "a," "an," and "the" include plural referents unless the context clearly dictates otherwise. Reference to "dry weight percent" or "dry weight basis" refers to weight on the basis of dry ingredients (i.e., all ingredients except water).

The disclosure provides a smokeless tobacco composition suitable for oral use. The smokeless tobacco composition generally includes a tobacco material formulation and one or more additional components that combine to form a dissolvable and lightly chewable smokeless tobacco pastille product for oral use. As used herein, the term "pastille" refers to a dissolvable oral product made by solidifying a liquid or gel composition, such as a composition that includes a gelling or binding agent, so that the final product is a hardened solid gel. As used herein, the terms "dissolve," "dissolving," and "dissolvable" refer to compositions having aqueous-soluble components that interact with moisture in the oral cavity and enter into solution, thereby causing gradual consumption of the product.

In certain embodiments, the products of the disclosure are characterized by sufficient cohesiveness to withstand light chewing action in the oral cavity without rapidly disintegrating. Additionally, certain embodiments of the pastille products of the invention can be described as moldable in the oral cavity, meaning the product is soft enough to allow the consumer to manipulate the shape of the product during use. However, the products of the disclosure typically do not exhibit a highly deformable chewing quality as found in conventional chewing gum.

Time of product use can vary, and depends, for example, on the exact product formulation and the manner in which the product is manipulated in the mouth (e.g., light or hard chewing action, frequent movement or infrequent movement, etc.). In certain embodiments, the pastille products of the invention are adapted to remain in the oral cavity prior to complete dissolution for at least about 15 minutes, at least about 20 minutes, at least about 30 minutes, or at least about 40 minutes.

The base pastille formulation of the invention includes both a gum component and a plurality of sugar alcohols as the primary components of the formulation. The formulations of the invention are adaptable in order to provide organoleptic experiences similar to traditional smokeless tobacco products with enhanced characteristics not found in traditional products. For example, combination of the base pastille formulation of the invention with a relatively high salt content and a milled particulate component (e.g., milled tobacco and/or a milled botanical from another plant source) creates a product, in certain embodiments, that provides sensory characteristics reminiscent of traditional oral snuff tobacco products (e.g., tobacco "dip") with one or more enhanced properties, such as reduced difficulty in retaining the product at one location in the mouth (i.e., elimination of unwanted product dispersal in the mouth), a reduction (or even elimination in some cases) in need to expectorate during use, reduction in mouth and throat irritation, reduction in undesirable mouthfeel (e.g., undesirable slickness or slimy texture), and reduction in waste requiring disposal following product use. In another example, combination of the base pastille formulation of the invention with a moderate salt content and a little or no aqueous-insoluble components creates a product, in certain embodiments, that provides sensory characteristics reminiscent of traditional tobacco snus with one or more enhanced properties, such as elimination of the need for a pouch (which may cause discomfort in the mouth), elimination of possible product dispersal in the mouth (such as if a snus pouch breaks), reduced time until flavor delivery to the consumer (as there is no pouch through which flavors must first pass), reduction in waste requiring disposal following product use, and an easily discerned product use endpoint due to the dissolvable nature of the product.

The smokeless tobacco pastilles of the disclosure typically include at least one tobacco material (e.g., a particulate tobacco material or tobacco-derived extract), at least one binder or gelling agent in the form of a natural gum, and a plurality of sugar alcohols.

The products of the disclosure will typically incorporate some form of a plant of the *Nicotiana* species, and most preferably, those compositions or products incorporate some form of tobacco. The selection of the plant from the *Nicotiana* species can vary; and in particular, the types of tobacco or tobaccos may vary. Tobaccos that can be employed include flue-cured or Virginia (e.g., K326), burley, sun-cured (e.g., Indian Kurnool and Oriental tobaccos, including Katerini, Prelip, Komotini, Xanthi and Yambol tobaccos), Maryland, dark, dark-fired, dark air cured (e.g., Passanda, Cubano, Jatin and Bezuki tobaccos), light air cured (e.g., North Wisconsin and Galpao tobaccos), Indian air cured, Red Russian and *Rustica* tobaccos, as well as various other rare or specialty tobaccos. Descriptions of various types of tobaccos, growing practices and harvesting practices are set forth in *Tobacco Production, Chemistry and Technology*, Davis et al. (Eds.) (1999), which is incorporated herein by reference. *Nicotiana* species can be derived using genetic-modification or crossbreeding techniques (e.g., tobacco plants can be genetically engineered or crossbred to increase or decrease production of or to other change certain components, characteristics or attributes). Additional information on types of *Nicotiana* species suitable for use in the present invention can be found in US Pat. Appl. Pub. No. 2012/0192880 to Dube et al., which is incorporated by reference herein. Tobacco plants can be grown in greenhouses, growth chambers, or outdoors in fields, or grown hydroponically.

The portion or portions of the plant of the *Nicotiana* species used according to the present invention can vary. For example, virtually all of the plant (e.g., the whole plant) can be harvested, and employed as such. Alternatively, various parts or pieces of the plant can be harvested or separated for further use after harvest. For example, the leaves, stem, stalk, roots, lamina, flowers, seed, and various portions and combinations thereof, can be isolated for further use or treatment. The plant material of the invention may thus comprise an entire plant or any portion of a plant of the *Nicotiana* species. See, for example, the portions of tobacco plants set forth in US Pat. Appl. Pub. Nos. 2011/0174323 to Coleman, III et al. and 2012/0192880 to Dube et al., which are incorporated by reference herein.

The plant of the *Nicotiana* species can be employed in either an immature or mature form, and can be used in either a green form or a cured form, as described in 2012/0192880 to Dube et al., which is incorporated by reference herein.

The tobacco material can be subjected to various treatment processes such as, refrigeration, freezing, drying (e.g., freeze-drying or spray-drying), irradiation, yellowing, heating, cooking (e.g., roasting, frying or boiling), fermentation, bleaching, or otherwise subjected to storage or treatment for later use. Exemplary processing techniques are described, for example, in US Pat. Appl. Pub. Nos. 2009/0025739 to Brinkley et al. and 2011/0174323 to Coleman, III et al., which are incorporated by reference herein.

Tobacco materials can be treated with enzymes and/or probiotics before or after harvest, as discussed in U.S. patent application Ser. No. 13/444,272 to Marshall et al., filed on Apr. 11, 2012 and U.S. patent application Ser. No. 13/553,222 to Moldoveanu, filed on Jul. 19, 2012, which are incorporated herein by reference. Tobacco materials may be irradiated, pasteurized, or otherwise subjected to controlled heat treatment. Representative processes are set forth in US Pat. Pub. Nos. 2009/0025738 to Mua et al.; 2009/0025739 to Brinkley et al.; and 2011/0247640 to Beeson et al., which are incorporated herein by reference. The tobacco material can be brought into contact with an imprinted polymer or non-imprinted polymer such as described, for example, in US Pat. Pub. Nos. 2007/0186940 to Bhattacharyya et al; 2011/0041859 to Rees et al.; 2011/0159160 to Jonsson et al; and 2012/0291793 to Byrd et al., all of which are incorporated herein by reference.

A harvested portion or portions of the plant of the *Nicotiana* species can be physically processed. A portion or portions of the plant can be separated into individual parts or pieces (e.g., roots can be removed from stalks, stems can be removed from stalks, leaves can be removed from stalks and/or stems, petals can be removed from the remaining portion of the flower). The harvested portion or portions of the plant can be further subdivided into parts or pieces (e.g., shredded, cut, comminuted, pulverized, milled or ground into pieces or parts that can be characterized as filler-type pieces, granules, particulates or fine powders). The harvested portion or portions of the plant can be subjected to external forces or pressure (e.g., by being pressed or subjected to roll treatment). When carrying out such processing conditions, the harvested portion or portions of the plant can have a moisture content that approximates its natural moisture content (e.g., its moisture content immediately upon harvest), a moisture content achieved by adding moisture to the harvested portion or portions of the plant, or a moisture content that results from the drying of the harvested portion or portions of the plant.

In certain embodiments, the tobacco material is used in a form that can be described as particulate (i.e., shredded, ground, granulated, or powder form). The manner by which the tobacco material is provided in a finely divided or powder type of form may vary. Preferably, plant parts or pieces are comminuted, ground or pulverized into a particulate form using equipment and techniques for grinding, milling, or the like. Most preferably, the plant material is relatively dry in form during grinding or milling, using equipment such as hammer mills, cutter heads, air control mills, or the like. For example, tobacco parts or pieces may be ground or milled when the moisture content thereof is less than about 15 weight percent or less than about 5 weight percent. Most preferably, the tobacco material is employed in the form of parts or pieces that have an average particle size less than about 50 microns. In one embodiment, the average particle size of the tobacco particles may be less than or equal to about 25 microns. In some instances, the tobacco particles may be sized to pass through a screen mesh. If desired, air classification equipment may be used to ensure that small sized tobacco particles of the desired sizes, or range of sizes, may be collected. If desired, differently sized pieces of granulated tobacco may be mixed together. Use of micro-milled tobacco particles (or other micro-sized botanical components) can be advantageous where the user prefers to reduce or eliminate product waste after use.

In certain embodiments, at least a portion of the tobacco material employed in the tobacco composition or product can have the form of an extract. Tobacco extracts can be obtained by extracting tobacco using a solvent having an aqueous character such as distilled water or tap water. As such, aqueous tobacco extracts can be provided by extracting tobacco with water, such that water insoluble pulp material is separated from the aqueous solvent and the water soluble and dispersible tobacco components dissolved and dispersed therein. Exemplary techniques for extracting components of tobacco are described in U.S. Pat. No. 4,144,895 to Fiore; U.S. Pat. No. 4,150,677 to Osborne, Jr. et al.; U.S. Pat. No. 4,267,847 to Reid; U.S. Pat. No. 4,289,147 to Wildman et al.; U.S. Pat. No. 4,351,346 to Brummer et al.; U.S. Pat. No. 4,359,059 to Brummer et al.; U.S. Pat. No. 4,506,682 to Muller; U.S. Pat. No. 4,589,428 to Keritsis; U.S. Pat. No. 4,605,016 to Soga et al.; U.S. Pat. No. 4,716,911 to Poulose et al.; U.S. Pat. No. 4,727,889 to Niven, Jr. et al.; U.S. Pat. No. 4,887,618 to Bernasek et al.; U.S. Pat. No. 4,941,484 to Clapp et al.; U.S. Pat. No. 4,967,771 to Fagg et al.; U.S. Pat. No. 4,986,286 to Roberts et al.; U.S. Pat. No. 5,005,593 to Fagg et al.; U.S. Pat. No. 5,018,540 to Grubbs et al.; U.S. Pat. No. 5,060,669 to White et al.; U.S. Pat. No. 5,065,775 to Fagg; U.S. Pat. No. 5,074,319 to White et al.; U.S. Pat. No. 5,099,862 to White et al.; U.S. Pat. No. 5,121,757 to White et al.; U.S. Pat. No.

5,131,414 to Fagg; U.S. Pat. No. 5,131,415 to Munoz et al.; U.S. Pat. No. 5,148,819 to Fagg; U.S. Pat. No. 5,197,494 to Kramer; U.S. Pat. No. 5,230,354 to Smith et al.; U.S. Pat. No. 5,234,008 to Fagg; U.S. Pat. No. 5,243,999 to Smith; U.S. Pat. No. 5,301,694 to Raymond et al.; U.S. Pat. No. 5,318,050 to Gonzalez-Parra et al.; U.S. Pat. No. 5,343,879 to Teague; U.S. Pat. No. 5,360,022 to Newton; U.S. Pat. No. 5,435,325 to Clapp et al.; U.S. Pat. No. 5,445,169 to Brinkley et al.; U.S. Pat. No. 6,131,584 to Lauterbach; U.S. Pat. No. 6,284,875 to Turpen et al.; U.S. Pat. No. 6,298,859 to Kierulff et al.; U.S. Pat. No. 6,772,767 to Mua et al.; U.S. Pat. No. 6,817,970 to Berit et al.; U.S. Pat. No. 6,906,172 to Bratcher et al.; U.S. Pat. No. 7,034,128 to Turpen et al.; U.S. Pat. No. 7,048,211 to Bratcher et al.; and U.S. Pat. No. 7,337,782 to Thompson, all of which are incorporated by reference herein. See also, the ultrafiltered translucent tobacco extracts set forth in US Pat. Appl. Pub. Nos. 2013/0074855 and 2013/0074856, both to Holton, Jr., which are incorporated by reference herein.

The tobacco-derived extract will typically comprise a mixture of desired components isolated from a plant of the *Nicotiana* species by various means. However, if desired, the tobacco-derived extract can be highly purified with respect to a single component of the extract or a small number of extract components. Typical separation processes that can further purify or isolate components of a tobacco extract include one or more process steps such as solvent extraction (e.g., using polar solvents, organic solvents, or supercritical fluids), chromatography (e.g., preparative liquid chromatography), clarification, distillation, filtration (e.g., ultrafiltration), recrystallization, and/or solvent-solvent partitioning. In some embodiments, a plant or a portion thereof is pre-treated, e.g., to liberate certain compounds to make the desired compounds available for more efficient separation. In some embodiments, multiple methods are used to isolate and/or purify the desired compounds. See, for example, the description of isolated tobacco components and techniques for isolation in US Pat. Appl. Pub. Nos. 2011/0174323 to Coleman, III et al.; 2011/0259353 to Coleman, III et al.; 2012/0192880 to Dube et al.; 2012/0192882 to Dube et al.; and 2012/0211016 to Byrd, Jr. et al., which are incorporated by reference herein.

Reference to "tobacco extract" as explained above encompasses extracts highly purified with respect to one or a few components thereof. For example, highly purified tobacco-derived nicotine (e.g., pharmaceutical grade nicotine having a purity of greater than 98% or greater than 99%) or a derivative thereof can be used in the present invention. Representative nicotine-containing extracts can be provided using the techniques set forth in U.S. Pat. No. 5,159,942 to Brinkley et al., which is incorporated herein by reference. Extracts containing relatively high nicotine content can be buffered, e.g., using buffering agents such as citric acid to lower the pH of the extracts.

The form of the tobacco extract (or isolate therefrom) obtained according to the present invention can vary. Typically, the isolate is in a solid, liquid, or semi-solid or gel form. The formulation can be used in concrete, absolute, or neat form. Solid forms of the tobacco isolate can include spray-dried and freeze-dried forms. Liquid forms of the tobacco isolate can include formulations contained within aqueous or organic solvent carriers.

In certain embodiments, the pastille of the invention can include nicotine in any form from any source, whether tobacco-derived or synthetically-derived. Normally, nicotinic compounds used in the present invention are selected from the group consisting of nicotine base, nicotine hydrochloride, nicotine dihydrochloride, nicotine monotartrate, nicotine bitartrate, nicotine sulfate, nicotine zinc chloride such as nicotine zinc chloride monohydrate and nicotine salicylate. In some embodiments, nicotine is in its free base form, which can optionally be sorbed on a carrier (e.g., microcrystalline cellulose) for inclusion in a smokeless tobacco product. See, for example, the nicotine/carrier compositions set forth in US Pat. Pub. No. 2004/0191322 to Hansson, which is incorporated by reference herein.

The relative amount of tobacco material within the smokeless tobacco composition may vary, and depends in part on the type of tobacco material employed (e.g., milled tobacco or tobacco extract). Preferably, the total amount of tobacco material (from any source including tobacco extracts or isolates and particulate tobacco material) formulation within the smokeless tobacco pastille is between about 0.1 and about 40 weight percent on a dry weight basis, more typically between about 0.2 and about 20 dry weight percent (e.g., between about 0.3 and about 12 dry weight percent). For embodiments containing only tobacco extract as the tobacco component (including pharmaceutical grade nicotine), the pastille will typically contain no more than about 10 dry weight percent of tobacco component, such as no more than about 8 dry weight percent, no more than about 5 dry weight percent, or no more than about 3 dry weight percent (e.g., about 0.1 to about 10 dry weight percent). For embodiments containing a particulate tobacco component (e.g., a finely milled tobacco), either as the sole tobacco component or in combination with a tobacco extract, the pastille will typically contain no more than about 12 dry weight percent of tobacco component, such as no more than about 10 dry weight percent, no more than about 8 dry weight percent, or no more than about 6 dry weight percent (e.g., about 1 to about 12 dry weight percent). The amount of tobacco material (or combination of tobacco material with other botanical components) will typically not exceed 40 dry weight percent in order to prevent the level of cellulosic material/biomass in the product from undesirably affecting the cohesiveness of the product.

In addition to (or in lieu of in certain embodiments) the above-noted tobacco material, products of the invention can include a further non-tobacco botanical material. As used herein, the term "botanical material" refers to any plant material, including plant material in its natural form and plant material derived from natural plant materials, such as extracts or isolates from plant materials or treated plant materials (e.g., plant materials subjected to heat treatment, fermentation, or other treatment processes capable of altering the chemical nature of the material). For the purposes of the present disclosure, a "botanical material" includes but is not limited to "herbal materials," which refer to seed-producing plants that do not develop persistent woody tissue and are often valued for their medicinal or sensory characteristics (e.g., teas or tisanes). Certain botanical materials of this type are sometimes referred to as dietary supplements, nutraceuticals, "phytochemicals" or "functional foods." Exemplary botanical materials, many of which are associated with antioxidant characteristics, include without limitation acai berry, alfalfa, allspice, annatto seed, apricot oil, basil, bee balm, wild bergamot, black pepper, blueberries, borage seed oil, bugleweed, cacao, calamus root, catnip, catuaba, cayenne pepper, chaga mushroom, chervil, cinnamon, dark chocolate, potato peel, grape seed, ginseng, gingko biloba, Saint John's Wort, saw palmetto, green tea, black tea, black cohosh, cayenne, chamomile, cloves, cocoa powder, cranberry, dandelion, grapefruit, honeybush, echinacea, garlic, evening primrose, feverfew, ginger, goldenseal, hawthorn, hibiscus flower, jiaogulan, kava, lavender, licorice, marjoram, milk thistle, mints (menthe), oolong tea, beet root, orange, oregano, papaya, pennyroyal, peppermint, red clover, rooibos (red or green), rosehip, rosemary, sage, clary sage, savory, spearmint, spirulina, slippery elm bark, sorghum bran hi-tannin, sorghum grain hi-tannin, sumac bran, comfrey leaf and root, goji berries, gutu kola, thyme, turmeric, uva ursi, valerian, wild yam root, wintergreen, yacon root, yellow dock, yerba mate, yerba santa, bacopa monniera, withania somnifera, and silybum marianum. When present in the composition, such botanical materials can be used in the same forms noted above with respect to tobacco (e.g., milled particulates or extracts) and the amounts utilized are typically such that the total tobacco and non-tobacco botanical material falls within the total amounts given above for tobacco materials in the compositions of the invention. In other words, the total content of tobacco and non-tobacco botanical materials will typically be between about 0.1 and about 40 weight percent on a dry weight basis, more typically between about 0.2 and about 20 dry weight percent (e.g., between about 0.3 and about 12 dry weight percent). Most preferably, the non-tobacco botanical material is employed in the form of an aqueous extract (e.g., freeze-dried or spray-dried extracts) or in powder form (e.g., having an average particle size less than about 50 microns).

In certain embodiments, the non-tobacco botanical will provide advantageous sensory characteristics (e.g., taste, aroma, or color) or other functional benefits, such as function as a binder or filler. In certain embodiments, the non-tobacco botanical may be associated with desirable bioactivity or health-related effects such as antioxidant qualities. In particularly preferred embodiments, the non-tobacco botanical components will complement the sensory characteristics associated with tobacco-derived materials in the formulation, and in some cases, will even contribute tobacco-like sensory characteristics. In some embodiments, the presence of the non-tobacco botanical is associated with mouth and throat sensory characteristics that are not dissonant with the overall desirable sensory characteristics of the product and, in some cases, can contribute to a reduction in mouth and/or throat irritation otherwise associated with the formulation. Green tea (*Camellia sinesis*), guayusa, rooibos (particularly green rooibos) and honeybush (particularly red honeybush) are particularly advantageous non-tobacco botanical components that can lead to the desirable characteristics set forth above.

Honeybush (genus *Cyclopia*) is a flowering plant in the legume family named for the honey-like aroma of its flowers. The honeybush plant is unique to South Africa and exemplary species include *Cyclopia genistoides, Cyclopia longifolia, Cyclopia maculata, Cyclopia subternata*, and *Cyclopia intermedia*. The leaves of the honeybush plant are sometimes used in tisanes. The shoots (leaves and twigs) of the Honeybush plant are typically harvested and chopped or shredded. Thereafter, the plant material can be used as-is in "green" form, which is lighter in color and less sweet, or subjected to a fermenting process to produce "red" honeybush, which enhances the sweetness and produces a rich amber color. Honeybush in either form can be purchased from specialty tea distributors. The honeybush plant is rich in antioxidants, such as mangiferin, and is being studied for its possible cancer-protective benefits. See Kokotkiewics, A & Luczkiewics, M. 2009. Honeybush (*Cyclopia* sp.)—A rich source of compounds with high antimutagenic properties. Fitoterapia 80 (2009) 3-11. In certain embodiments, honeybush is present in an amount of up to about 15 dry weight percent, such as about 1 to about 5 dry weight percent in aqueous extract form, or about 5 to about 10 dry weight percent in powder form.

Like honeybush, rooibos (*Aspalathus linearis*) is also a flowering plant in the legume family indigenous to South Africa, and its leaves are also used in tisanes. The rooibos plant is harvested and processed in a manner similar to honeybush described above, and is available in green or red (fermented) forms. Rooibos in either form can be purchased from specialty tea distributors. The rooibos plant is rich in antioxidants and is being studied for its possible health-protective benefits. See The Science Behind Roobios—South Africa's Unique and Healthy Herbal Tea, South African Rooibos Council, July 2013. In certain embodiments, rooibos is present in an amount of up to about 15 dry weight percent, such as about 1 to about 5 dry weight percent in aqueous extract form, or about 5 to about 10 dry weight percent in powder form.

The moisture content of the tobacco material formulation (or other botanical) prior to mixing with any liquid substances to form the smokeless tobacco composition may vary. Most preferably, the moisture content of the tobacco material formulation is less than about 10 weight percent, and may be less than about 5 percent, and is often less than about 2.5 weight percent. The manner by which the moisture content of the tobacco material formulation is controlled may vary. For example the tobacco material formulation may be subjected to thermal or convection heating. As a specific example, the tobacco material formulation may be oven-dried, in warmed air at temperatures of about 40° C. to about 95° C. for a length of time appropriate to attain the desired moisture content. For example, the tobacco material formulation may be dried for about 12 hours to about 24 hours at about 54° C. to about 60° C.

A binder (or combination of binders) may be employed in amounts sufficient to provide the desired physical attributes and physical integrity to the smokeless tobacco composition. In certain embodiments, the binder material includes a natural gum. As used herein, a natural gum refers to polysaccharide materials of natural origin that are useful as thickening or gelling agents. Representative natural gums derived from plants, which are typically water soluble to some degree, include xanthan gum, guar gum, gum arabic, ghatti gum, gum tragacanth, karaya gum, locust bean gum, gellan gum, and combinations thereof. A representative amount of binder (e.g., natural gum) is between about 25 and about 40 percent of the total dry weight of the composition. In certain embodiments, the binder component(s) of the composition will be present in an amount of at least about 20 dry weight percent, or at least about 25 dry weight percent, or at least about 28 dry weight percent. Preferably, the total amount of binder within the composition will not exceed about 38 percent of the total dry weight of the composition, or will not exceed about 36 dry weight percent, or will not exceed about 34 dry weight percent.

The smokeless tobacco compositions of the disclosure typically includes a plurality of sugar alcohols, which are particularly advantageous as filler components in the pastilles of the disclosure because such materials contribute some sweetness and do not disrupt the desired chewable characteristics of the final product. Sugar alcohols are polyols derived from monosaccharides or disaccharides that have a partially or fully hydrogenated form. Exemplary sugar alcohols have between about 4 and about 20 carbon atoms and include erythritol, arabitol, ribitol, isomalt, polyglycitol, maltitol, dulcitol, iditol, mannitol, xylitol, lactitol, sorbitol, and combinations thereof (e.g., hydrogenated starch hydrolysates). A sugar alcohol is typically added to compositions of the disclosure in the form of an aqueous solution or suspension, such as a solution or suspension with a solids content of about 50 to about 90 weight percent. Sugar alcohols can fulfill multiple functions, such as providing sweetness, enhancing certain organoleptic properties such as texture and mouthfeel, enhancing cohesiveness or compressibility of the product, and the like.

A combination of sugar alcohols is typically utilized in the present invention. The exact combination of sugar alcohols used in any given formulation can be selected based on a number of factors, including laxation threshold, relative sweetness, calorie content, glycemic index, degree of hygroscopicity, and the like. In the present invention, the predominant sugar alcohol component is typically isomalt, and isomalt is typically used in an amount of at least about 75% of the total dry weight of sugar alcohols, such as at least about 80% by dry weight. Exemplary weight percentages of isomalt as a percentage of total sugar alcohol dry weight is about 75 to about 85% (e.g., about 80 to about 85%). In certain embodiments, isomalt is replaced with erythritol as the predominant sugar alcohol at the percentages noted above. Certain embodiments utilizing erythritol as the predominant sugar alcohol will exhibit a slight cooling sensation as compared to embodiments comprising predominantly isomalt.

The combination of sugar alcohols will also include at least one additional sugar alcohol, and in preferred embodiments, will include at least two additional sugar alcohols. In certain embodiments, the additional sugar alcohols will comprise two additional sugar alcohols in a dry weight ratio of at least about 3:1, at least about 3.5:1, or at least about 4:1. Exemplary sugar alcohols useful as the larger component in the ratio include erythritol or sorbitol. In embodiments where erythritol is instead used as the predominant sugar alcohol, isomalt could also be used as the larger component. Examples of the minor component in the ratio include maltitol, sorbitol, or xylitol.

The total sugar alcohol content of the pastilles of the invention will typically range from about 40 to about 60 dry weight percent, such as about 42 to about 58 dry weight percent, or about 46 to about 53 dry weight percent. The sugar alcohol content of the pastille will typically be at least about 42 dry weight percent, or at least about 44 dry weight percent, or at least about 46 dry weight percent. The sugar alcohol content of the pastille will typically not exceed about 58 dry weight percent, such as no more than about 56 dry weight percent, or no more than about 54 dry weight percent.

A salt (e.g., sodium chloride, flour salt) may be employed in amounts sufficient to provide desired sensory attributes to the smokeless tobacco composition. When present, a representative amount of salt is at least about 0.5 dry weight percent, or at least about 1.0 dry weight percent, or at least about 1.5 dry weight percent, but will typically may make up less than about 8 percent of the total dry weight of the composition (e.g., about 0.5 to about 7 dry weight percent).

A humectant (e.g., glycerin) may be employed in amounts sufficient to provide desired moisture attributes to the smokeless tobacco composition. Further, in some instances, the humectant may impart desirable flow characteristics to the smokeless tobacco composition for depositing in a starch mould. When present, a representative amount of humectant is at least about 0.5 dry weight percent, or at least about 1.0 dry weight percent, or at least about 1.5 dry weight percent, but will typically make up less than about 5 percent of the total dry weight of the composition (e.g., about 0.5 to about 4 dry weight percent).

The pastilles of the invention may further include one or more flavorants. As used herein, a "flavorant" or "flavoring agent" is any flavorful or aromatic substance capable of altering the sensory characteristics associated with the smokeless tobacco composition. Exemplary sensory characteristics that can be modified by the flavorant include, taste, mouthfeel, moistness, coolness/heat, and/or fragrance/aroma. The flavorants can be natural or synthetic, and the character of these flavors can be described as, without limitation, fresh, sweet, herbal, confectionary, floral, fruity or spice. Specific types of flavors include, but are not limited to, vanilla, coffee, chocolate, cream, mint (e.g., mint oil), spearmint, menthol, peppermint, wintergreen, lavender, cardamon, nutmeg, cinnamon, clove, cascarilla, sandalwood, honey, jasmine, ginger, anise, sage, licorice, lemon, orange, apple, peach, lime, cherry, and strawberry. Flavorants utilized in the disclosure also can include components that are considered moistening, cooling or smoothening agents, such as eucalyptus. These flavors may be provided neat (i.e., alone) or in a composite (e.g., spearmint and menthol or orange and cinnamon). In some instances, the flavorant may be provided in a spray-dried form or a liquid form. Flavorants are typically present in an amount of about 0.3 to about 10 dry weight percent, often about 0.4 to about 5 dry weight percent, and most often about 1 to about 3 dry weight percent.

Sweeteners can be used in natural or artificial form or as a combination of artificial and natural sweeteners to provide additional sweetness (in addition to the plurality of sugar alcohols). In one embodiment, sucralose is the primary sweetener ingredient. When present, a representative amount of additional sweetener is about 0.01 to about 0.5 dry weight percent, often about 0.03 to about 0.1 dry weight percent, and most often about 0.04 to about 0.08 dry weight percent.

Further ingredients can be admixed with, or otherwise incorporated within, the smokeless tobacco compositions according to the invention. The ingredients can be artificial, or can be obtained or derived from herbal or biological sources. Exemplary types of additional ingredients include additional organic and/or inorganic fillers (e.g., grains, puffed grains, dextrose, calcium carbonate, calcium phosphate, corn starch, finely divided cellulose, and the like); additional binders (e.g., povidone, sodium carboxymethylcellulose and other modified cellulosic types of binders, sodium alginate, starch-based binders, lecithin, and the like); pH adjusters or buffering agents (e.g., metal hydroxides, preferably alkali metal hydroxides such as sodium hydroxide and potassium hydroxide, and other alkali metal buffers such as metal carbonates, preferably potassium carbonate or sodium carbonate, or metal bicarbonates such as sodium bicarbonate, and the like); colorants (e.g., dyes and pigments, including caramel coloring and titanium dioxide, and the like); effervescing materials such as certain acid/base combinations; oral care additives (e.g., thyme oil, eucalyptus oil, and zinc); preservatives (e.g., potassium sorbate, and the like); amino acids; and disintegration aids (e.g., microcrystalline cellulose, croscarmellose sodium, crospovidone, sodium starch glycolate, pregelatinized corn starch, and the like). Exemplary encapsulated additives are described, for example, in WO 2010/132444 to Atchley, which has been previously incorporated by reference herein. See also, the smokeless tobacco ingredients set forth in US Pat. Pub. Nos. 2012/0055494 to Hunt et al. and 2012/0199145 to Byrd et al., which are incorporated by reference herein.

As noted above, the basic pastille formulation of the invention provides a platform for developing smokeless tobacco products that are reminiscent of various traditional smokeless tobacco categories. For example, an exemplary pastille product useful for providing a sensory experience similar to traditional oral snuff tobacco comprises: (i) at least one solid particulate component, in the form of tobacco particles or other botanical particles (or both), the particulate component present in an amount of at least about 5 dry weight percent (e.g., about 5 to about 20 dry weight percent); (ii) a natural gum binder (e.g., gum arabic) present in an amount of at least about 25 dry weight percent (e.g., about 25 to about 35 dry weight percent); (iii) a plurality of sugar alcohols present in an amount of at least about 40 dry weight percent (e.g., about 40 to about 55 dry weight percent), the plurality of sugar alcohols including isomalt or erythritol as the predominant component (e.g., at least about 75% of total dry weight of sugar alcohols); (iv) salt present in an amount of at least about 4 dry weight percent (e.g., about 4 to about 8 dry weight percent); (v) an optional humectant in an amount of at least about 1 dry weight percent (e.g., about 1 to about 4 dry weight percent); (vi) an optional tobacco extract (including pharmaceutical grade nicotine) or other botanical extract present in an amount of at least about 0.1 dry weight percent (e.g., about 0.1 to about 5 dry weight percent); and (vii) the balance being one or more additional optional ingredients such as sweeteners (e.g., sucralose), colorants, flavorants, and outer coating materials, each of such additional optional ingredients present in an amount of less than about 3 dry weight percent (e.g., about 0.1 to about 3 dry weight percent), all weight percentages based on the total dry weight of the pastille.

Still further, an exemplary pastille product useful for providing a sensory experience similar to traditional snus tobacco comprises: (i) at least one aqueous tobacco extract (including pharmaceutical grade nicotine) or other aqueous botanical extract (or both), the extract component present in an amount of at least about 1 dry weight percent (e.g., about 1 to about 5 dry weight percent); (ii) a natural gum binder (e.g., gum arabic) present in an amount of at least about 30 dry weight percent (e.g., about 30 to about 40 dry weight percent); (iii) a plurality of sugar alcohols present in an amount of at least about 45 dry weight percent (e.g., about 45 to about 60 dry weight percent), the plurality of sugar alcohols including isomalt or erythritol as the predominant component (e.g., at least about 75% of total dry weight of sugar alcohols); (iv) salt present in an amount of less than about 4 dry weight percent (e.g., about 1 to about 3.5 dry weight percent); (v) an optional humectant in an amount of at least about 1 dry weight percent (e.g., about 1 to about 4 dry weight percent); (vi) an optional solid particulate tobacco or other botanical material present in an amount of less than about 8 dry weight percent (e.g., about 1 to about 8 dry weight percent); and (vii) the balance being one or more additional optional ingredients such as sweeteners (e.g., sucralose), colorants, flavorants, and outer coating materials, each of such additional optional ingredients present in an amount of less than about 3 dry weight percent (e.g., about 0.001 to about 3 dry weight percent), all weight percentages based on the total dry weight of the pastille. The particular percentages and choice of ingredients will vary depending upon the desired flavor, texture, and other characteristics.

All of the ingredients noted above for combination with a tobacco material can be provided in a powder or granulated form for mixing with the tobacco material formulation or provided in liquid form. Where the ingredient is provided in a powder or granulated form, the average particle size is typically less than about 50 microns. According to some aspects, the average particle size of the ingredients may be about 25 microns or less. The moisture content of the ingredients provided in a powder or granulated form may vary. Most preferably, the moisture content of the ingredient provided in a powder or granulated form is less than about 10 weight percent, and may be less than about 5 percent, and is often less than about 2.5 weight percent.

The manner by which the various components of the smokeless tobacco composition are combined may vary. The various components of the smokeless tobacco composition may be contacted, combined, or mixed together in conical-type blenders, mixing drums, ribbon blenders, or the like, such as a Hobart mixer. As such, the overall mixture of various additional ingredients with the tobacco materials may be relatively uniform in nature. See also, for example, the types of methodologies set forth in U.S. Pat. No. 4,148,325 to Solomon et al.; U.S. Pat. No. 6,510,855 to Korte et al.; and U.S. Pat. No. 6,834,654 to Williams, each of which is incorporated herein by reference.

The ingredients forming the dissolvable smokeless tobacco composition are prepared such that the mixture thereof may be used in a starch moulding process for forming the smokeless tobacco product. Exemplary pastille production processes are set forth in U.S. Pat. No. 4,725,440 to Ridgway et al and U.S. Pat. No. 6,077,524 to Bolder et al., which are incorporated by reference herein.

In one embodiment, the process comprises providing an aqueous mixture for mixing with dry ingredients. In some instances, the aqueous mixture may be formed by hydrating a binder material with water, and then admixing the hydrated binder with a sweetener and/or other liquid or dissolvable components, using a high shear mixer or a Hobart mixing bowl with a whipping attachment. The liquid component mixed with the hydrated binder, or even used to hydrate the binder, can include aqueous components other than water, such as plant juices (which may be fermented or non-fermented). Exemplary aqueous components include fruit juice, vegetable juice, and wine. Such components can be useful for providing hydration of the binder, and also useful for introducing functional properties associated with the botanical component from which the liquid is derived, such as certain sensory characteristics (e.g., flavor, aroma, or color) or bioactivity or health benefits associated with the botanical. In particular, the addition of red wine can produce favorable changes in flavor and antioxidant properties of the smokeless product.

In a separate mixer, the plurality of sugar alcohols can be combined and heated to a high temperature, typically above the hard crack stage for the predominant sugar alcohol. For instance, where isomalt is the predominant ingredient, the sugar alcohol is melted and heated to above 155° C. (e.g., about 160 to about 180° C.), optionally in the presence of other less volatile ingredients such as salt, and then cooled and added to the hydrated gum and mixed in thoroughly. This aqueous mixture typically has a moisture content of at least about 30 percent by weight water, based on the total weight of the mixture.

The aqueous mixture is mixed with a tobacco material or other botanical material (e.g., a particulate tobacco material and/or tobacco extract), and optionally other dry additives, in a Hobart mixing bowl to form a smokeless tobacco composition in slurry form. The smokeless tobacco composition may then be heated to an elevated temperature for a period of time, for example, heated to between about 40° C. to about 80° C., and typically heated to about 70° C., for a period of about 1 to about 3 minutes. The resulting smokeless tobacco composition typically has a moisture content of at least about 25 percent by weight water, based on the total weight of the mixture.

According to some aspects, the mixture may be put through a deaerating step or process prior to being received in a mould or being subjected to other processing steps, so as to reduce or eliminate air bubbles present in the slurry mixture. Air bubbles entrapped within the mixture may affect the final weight of the smokeless tobacco product, which could lead to a lack of weight uniformity between units of the final smokeless tobacco product. As such, any deaerating methods and systems may be employed for removing such air bubbles from the mixture. For example, the mixture may be placed under reduced pressure (i.e., below atmospheric pressure) to pull the air bubbles out of the slurry mixture. In some instances, a vacuum deaerating process may be employed in which the mixture is placed in a vacuum deaerator for deaerating the mixture using pressure reduction. In some instances, the mixture may be under vacuum for about 1 to about 10 minutes, and typically for about 3 to about 5 minutes. The deaerating step may be observed and adjusted accordingly in order to controllably remove the gaseous components from the mixture.

The viscosity of the heated and deaerated mixture may be measured using, for example, a Brookfield viscometer HA Series, SC4 water jacket, 27/13R sample chamber and a No. 27 spindle. The mixture will typically have a viscosity of about 5.7 Pascal-seconds (Pa·s) to about 6.2 Pa·s when heated to a temperature of about 38° C., about 4.9 Pa·s to about 5.4 Pas when heated to a temperature of about 43° C., and about 4.2 Pa·s to about 4.7 Pa·s when heated to a temperature of about 50° C. In some instances, extra water may be added to the smokeless tobacco composition so as to provide a desired viscosity thereof.

Once the desired viscosity is achieved, the heated smokeless tobacco composition may then be deposited into a mould, such as, for example, a starch mould. While the process as further described herein is directed to forming a smokeless tobacco product using a starch mould, it is noted that other types of moulds may be used in the process, such as, for example, starchless moulds, plastic tray moulds, metallic tray moulds, neoprene tray moulds, etc.

In instances involving the use of starch moulds, the starch moulds can be pre-dried to remove moisture content from the starch mould itself. That is, prior to receiving the slurry or viscous smokeless tobacco composition, the starch mould may be subjected to an elevated temperature to drive out moisture in the starch mould. For example, in some instances, the starch mould may initially have a moisture content of about 10-15 weight percent. Such levels of moisture could potentially have an effect on the uniformity of the resultant product. In this regard, certain moisture levels in the starch mould could potentially have a wrinkling or pruning effect on the product such that the final product has a shriveled or otherwise wrinkled appearance. As such, the starch mould may be dried at an elevated temperature to reduce the moisture content of the starch mould to between about 4 and about 10 weight percent, and preferably between about 6 and about 8 weight percent, based on the total weight of the starch mould. By taking such steps, the product may, in some instances, be more uniformly consistent in appearance. Furthermore, the starch mould may be heated to an elevated temperature prior to receiving the smokeless tobacco composition such that the starch mould itself is at an elevated temperature when receiving the smokeless tobacco composition.

The smokeless tobacco composition remains in the starch mould at an elevated temperature such as, for example, between about 40° C. to about 80° C. (e.g., at least about 40° C. or at least about 50° C.), and typically about 60° C. The smokeless tobacco composition may be held at the elevated temperature for a predetermined duration of time such as, for example, about 15-25 hours, so as to allow the smokeless tobacco composition to cure and solidify into pastille form, while driving the moisture content of the smokeless tobacco composition to a desired final moisture level. In this regard, curing generally refers to the solidification process in which moisture loss occurs, the viscosity of the composition is raised, and chemical and physical changes begin to occur (e.g., crystallization, cross-linking, gelling, film forming, etc.). The smokeless tobacco composition is allowed to cool and thereafter removed from the starch mould. In some instances, the smokeless tobacco composition may be allowed to cool at refrigerated or below ambient temperatures. An air blower/shaker device can be used to remove starch remnants from the smokeless tobacco composition after being removed from the starch mould.

The smokeless tobacco composition is then typically allowed to post-cure for a time and at a temperature suitable to allow the composition to become equilibrated to a desired moisture, shape and form. The time and temperature can vary without departing from the invention and depend in part on the desired final characteristics of the product. In one embodiment, the post-cure is conducted at ambient temperature for at least about 20 hours after being removed from the mould. The resultant pastille product may be provided in individual pieces weighing between about 0.5 grams to about 5 grams, although aspects of the present disclosure are not limited to such weights.

The curing times and temperatures of the smokeless tobacco composition can be varied as desired. In this regard, such variables may affect the final visual appearance of the smokeless tobacco product. For example, extended curing times and/or low curing temperatures may affect the final outer configuration or contours of the smokeless tobacco product. That is, the rate of drying and/or curing of the product can affect the final properties of the product. In some instances, for example, lowering the curing temperature and extending the curing time may cause the smokeless tobacco product to have a relatively smooth outer surface. In contrast, curing at higher temperatures for shorter period of times can lead to a roughened or wrinkled appearance in the product.

According to other aspects of the present disclosure, rather than using moulds to prepare the smokeless tobacco product, an extrusion process may be employed in which the final smokeless tobacco product is extruded. In some instances, the smokeless tobacco composition in wet mixture form may be formed into a sheet and allowed to dry to a moisture content, for example, of about 15 percent to about 25 percent by weight water to form a tacky or otherwise pasty material, which is in a form capable of physical handling. The material may then be chopped or otherwise cut into smaller pieces using, for example, a mixer. The chopped material may then be extruded through an extrusion device to any shape/size desired, including shapes that may be difficult or impossible to achieve with a mould. In some instances, the extruded product may then be dried to achieve a desired moisture content. A similar type process is described, for example, in U.S. Pat. No. 3,806,617 to Smylie et al., which is incorporated herein by reference in its entirety. Further, the smokeless tobacco composition may be subjected to a co-extrusion process with another composition.

Shapes such as, for example, rods and cubes can be formed by first extruding the material through a die having the desired cross-section (e.g., round or square) and then optionally cutting the extruded material into desired lengths. Techniques and equipment for extruding tobacco materials are set forth in U.S. Pat. No. 3,098,492 to Wursburg; U.S. Pat. No. 4,874,000 to Tamol et al.; U.S. Pat. No. 4,880,018 to Graves et al.; U.S. Pat. No. 4,989,620 to Keritsis et al.; U.S. Pat. No. 5,072,744 to Luke et al.; U.S. Pat. No. 5,829,453 to White et al.; and U.S. Pat. No. 6,182,670 to White et al.; each of which is incorporated herein by reference. Exemplary extrusion equipment suitable for use include food or gum extruders, or industrial pasta extruders such as Model TP 200/300 available from Emiliomiti, LLC of Italy. In some instances, a single machine may be capable of achieving multiple steps of the processes described herein, such as, for example, kneader systems available from Buss AG.

According to some embodiments, the smokeless tobacco composition may be coated with a coating substance after being removed from the starch mould and prior to drying. For example, a glazing or anti-sticking coating substance, such as, for example, CAPOL® 410 or 570C (available from Centerchem, Inc.), may be applied to the smokeless tobacco composition to provide free-flowing properties. Outer coatings can also help to improve storage stability of the smokeless tobacco products of the present disclosure as well as improve the packaging process by reducing friability and dusting. Devices for providing outer coating layers to the products of the present disclosure include pan coaters and spray coaters, and particularly include the coating devices available as CompuLab 24, CompuLab 36, Accela-Cota 48 and Accela-Cota 60 from Thomas Engineering. Additional coating compositions and methods of application are described in US Pat. Pub. No. 2012/0055494 to Hunt et al., which is incorporated by reference herein.

The smokeless tobacco pastille product can be dried or moistened to reach the final desired moisture level. The moisture content of the smokeless tobacco product prior to use by a consumer can vary. Typically, the moisture content of the smokeless tobacco product, as present within a single unit of product prior to insertion into the mouth of the user, is within the range of about 5 to about 20 weight percent, often about 8 to about 15 weight percent, more often about 10 to about 13 weight percent, based on the total weight of the product unit.

The acidity or alkalinity of the smokeless tobacco product, which is often characterized in terms of pH, can vary and will depend, in part, on whether the product is formulated with a pH adjuster or buffering agent. Typically, the pH of the formulation will fall within the range of about 4.5 to about 9. If a base or alkaline buffering agent is present, the pH is typically toward the upper end of the range, such as about 6.5 to about 8. If the product is formulated without a pH adjuster or buffering agent, in certain embodiments, the pH will range from about 4.5 to about 6.5. A representative technique for determining the pH of a smokeless tobacco formulation involves dispersing 5 g of that formulation in 100 ml of high performance liquid chromatography water, and measuring the pH of the resulting suspension/solution (e.g., with a pH meter).

The dissolvable smokeless tobacco pastille product can be provided in any suitable predetermined shape or form, and most preferably is provided in the form having a general shape of a pill, pellet, tablet, coin, bead, ovoid, obloid, cube, or the like. The mouthfeel of the smokeless tobacco product preferably has a slightly chewable and dissolvable quality with a mild resilience that allows malleability during use. Preferably, the products do not, to any substantial degree, leave any residue in the mouth of the user thereof, and do not impart a slick, waxy, or slimy sensation to the mouth of the user. The pastille is sized appropriately for insertion and manipulation in the oral cavity by the consumer, with typical outer dimensions including lengths and widths of between about 10 mm and about 60 mm.

Although the foregoing description focuses on compositions that are uniform throughout each product unit, products can also be formed with multiple different formulations having different properties in the same product unit. For example, two different compositions can be deposited in a single mold to product a layered product. Still further, two different compositions could be co-extruded to form a product with different characteristics across its cross-section. Such a process could be used to provide a product with two different compositions featuring different dissolution rates such that a first portion of the product dissolves at a first rate (e.g., a faster rate) and a second portion dissolves at a second, slower rate.

Products of the present disclosure may be packaged and stored in any suitable packaging. See, for example, the various types of containers for smokeless types of products that are set forth in U.S. Pat. No. 7,014,039 to Henson et al.; U.S. Pat. No. 7,537,110 to Kutsch et al.; U.S. Pat. No. 7,584,843 to Kutsch et al.; D592,956 to Thiellier; D594,154 to Patel et al.; and D625,178 to Bailey et al.; US Pat. Pub. Nos. 2008/0173317 to Robinson et al.; 2009/0014343 to Clark et al.; 2009/0014450 to Bjorkholm; 2009/0250360 to Bellamah et al.; 2009/0266837 to Gelardi et al.; 2009/0223989 to Gelardi; 2009/0230003 to Thiellier; 2010/0084424 to Gelardi; 2010/0133140 to Bailey et al.; 2010/0264157 to Bailey et al.; 2011/0168712 to Bailey et al.; and 2011/0204074 to Gelardi et al., which are incorporated herein by reference.

EXPERIMENTAL

The following examples are provided to illustrate further aspects associated with the present disclosure, but should not be construed as limiting the scope thereof. Unless otherwise noted, all parts and percentages are by dry weight.

Example 1

A pastille product adapted for use as a substitute for oral snuff is produced using the following weight percentages of ingredients. Note that the percentages listed in Table 1 include water.

TABLE 1

Wet weight percentages of ingredients

| Ingredient | Wet Weight % |
|---|---|
| Gum Arabic Powder | 22.00 |
| Cold Water (for hydration of gum) | 22.00 |
| Isomalt Powder | 27.40 |
| Erythritol | 4.90 |
| Maltitol Syrup | 1.50 |
| Glycerin | 1.60 |
| Sucralose | 0.04 |

TABLE 1-continued

Wet weight percentages of ingredients

| Ingredient | Wet Weight % |
|---|---|
| Salt (sodium chloride) | 4.50 |
| Fire-cured Milled Tobacco | 4.57 |
| Fire-cured tobacco spray-dried extract | 3.00 |
| Caramel Color | 1.20 |
| Licorice Flavorant | 0.370 |
| Additional Flavorant | 0.80 |
| Water | 6.00 |
| Capol 570C (Centerchem, Inc.)* | 0.070 |

*0.1% coating applied to finished product as anti-sticking agent

To prepare the product, two times the amount of gum arabic and water are mixed together in a high speed mixer for 30 minutes at a low speed. This mixture is heated overnight at 60° C. and 25% relative humidity in a covered container. The mixture is removed from the heat source and foamy portion is discarded.

220 grams of hydrated gum arabic solution from above is weighed. The actual grams of each ingredient listed here can vary depending on the batch size, but the weight percentages will remain approximately the same. The warm gum mixture is placed into a stirring cooker with paddle on slow and gently stirred while heating to about 155-160° F. (68 to 71° C.).

30 grams of water is weighed into a beaker. About 10.0 grams of salt is added to the water and dissolved. The above indicated recipe levels of sucralose (0.18 grams), Licorice flavor (1.85 grams), caramel color (6.00 grams) and glycerin (8.0 grams) are added to the water and stirred. This water mixture is then added to the stirring cooker.

In a separate heating pan, the isomalt powder (137.25 grams), erythritol (24.50 grams), and maltitol syrup (7.50 grams) are mixed together and heated to about 350° F. (177° C.). While this mixture is heating, about 12.5 grams of salt is added to the stirring cooker. Following the addition of the salt, the additional flavor (4.00 grams) is weighed and added to the stirring cooker. After the isomalt, erythritol and maltitol mixture has been heated to desired temperature, this mixture is cooled to about 290° F. (143° C.) and then added slowly to the stirring cooker. The temperature in the stirring cooker increases, but cools quickly. Once the slurry in the stirring cooker is cooled to 160° F. (71° C.), the fire-cured milled tobacco (22.85 grams) and the fire-cured spray-dried Extract (15.00 grams) are added to the stirring cooker. The slurry is stirred for one minute. The slurry is then poured into a depositor for depositing.

A starch bed is prepared by preheating a starch tray in 60° C., 25% relative humidity. An impression is made in the in the tray and filled with the slurry using a depositor. After depositing the slurry into the tray, the deposited slurry pieces are covered with sifted corn starch such that there is about 1" height of corn starch above the deposited pieces. The deposited trays are placed in an environmental cabinet for 17 hours at 60° C., 25% relative humidity. The pieces are removed from the starch tray and the remaining starch is sprayed off. 0.1% (0.35 grams) level of anti-stick coating (Capol 570C) is applied by hand or using a coating pan. The moisture level and pH is then measured. Prior to depositing, the starch moisture in the trays is approximately 6% moisture or less after pre-drying in the environmental cabinet. The targeted moisture content in each pastille is about 8% or less after drying. Table 2 below shows the dry weight percent of each ingredient in each pastille made according to the procedure above, as well as the weight percent of each ingredient at a targeted 8% moisture content level.

TABLE 2

Final product weight percentages

| Ingredient | Dry Weight Percent | Weight Percent at 8% Moisture Content |
|---|---|---|
| Gum Arabic Powder | 29.73 | 27.35 |
| Cold Water | 0.00 | 8.00 |
| Isomalt Powder | 39.16 | 36.02 |
| Erythritol | 6.99 | 6.43 |
| Maltitol Syrup | 1.69 | 1.55 |
| Glycerin | 2.38 | 2.19 |
| Sucralose | 0.06 | 0.05 |
| Salt | 6.62 | 6.09 |
| Fire-cured Milled Tobacco | 6.11 | 5.62 |
| Fire-cured Tobacco Spray-dried Extract | 4.19 | 3.85 |
| Caramel Color | 1.26 | 1.16 |
| Licorice Flavorant | 0.53 | 0.49 |
| Additional Flavorant | 1.19 | 1.09 |
| Capol® 570C | 0.11 | 0.10 |

Example 2

A pastille product adapted for use as a substitute for snus is produced using the same general process and formulation set forth in Example 1, except the milled tobacco is replaced with milled green tea, a different colorant is used, the licorice flavoring is removed, and less salt is used.

Table 3 below shows the dry weight percent of each ingredient in each pastille made according to this procedure, as well as the weight percent of each ingredient at a targeted 12% moisture content level. The weight percentages do not include a 0.2 weight percent Capol® 570C coating applied to the product.

TABLE 3

Final product weight percentages

| Ingredient | Dry Weight Percent | Weight Percent at 12% Moisture Content |
|---|---|---|
| Gum Arabic Powder | 33.29 | 29.29 |
| Cold Water | 0.00 | 12.00 |
| Isomalt Powder | 42.46 | 37.36 |
| Erythritol | 7.32 | 6.44 |
| Maltitol Syrup | 1.73 | 1.53 |
| Glycerin | 2.29 | 2.01 |
| Sucralose | 0.05 | 0.04 |
| Salt | 2.27 | 1.99 |
| Milled Green Tea | 5.95 | 5.23 |
| Spray-dried Tobacco Extract | 3.51 | 3.09 |
| Blue Colorant | 0.00 | 0.0000254 |
| Flavorant | 0.92 | 0.81 |

Example 3

A pastille product adapted for use as a substitute for snus is produced using the same general process and formulation set forth in Example 2, except the milled green tea is removed.

Table 4 below shows the dry weight percent of each ingredient in each pastille made according to this procedure, as well as the weight percent of each ingredient at a targeted 12% moisture content level. The weight percentages do not include a 0.2 weight percent Capol® 570C coating applied to the product.

TABLE 4

Final product weight percentages

| Ingredient | Dry Weight Percent | Weight Percent at 12% Moisture Content |
|---|---|---|
| Gum Arabic Powder | 36.83 | 32.41 |
| Cold Water | 0.00 | 12.00 |
| Isomalt Powder | 44.18 | 38.88 |
| Erythritol | 8.50 | 7.48 |
| Maltitol Syrup | 1.86 | 1.64 |
| Glycerin | 2.76 | 2.43 |
| Sucralose | 0.05 | 0.05 |
| Salt | 2.73 | 2.41 |
| Spray-dried Tobacco Extract | 2.62 | 2.31 |
| Blue Colorant | 0.00 | 0.0002558 |
| Flavorant | 0.46 | 0.41 |

Example 4

A pastille product adapted for use as a substitute for snus is produced using the same general process and formulation set forth in Example 3, except microcrystalline cellulose (MCC) made from tobacco is added.

Table 5 below shows the dry weight percent of each ingredient in each pastille made according to this procedure, as well as the weight percent of each ingredient at a targeted 12% moisture content level. The weight percentages do not include a 0.2 weight percent Capol® 570C coating applied to the product.

TABLE 5

Final product weight percentages

| Ingredient | Dry Weight Percent | Weight Percent at 12% Moisture Content |
|---|---|---|
| Gum Arabic Powder | 31.83 | 28.01 |
| Cold Water | 0.00 | 12.00 |
| Isomalt Powder | 43.82 | 38.56 |
| Erythritol | 8.22 | 7.24 |
| Maltitol Syrup | 1.84 | 1.62 |
| Glycerin | 2.74 | 2.41 |
| Sucralose | 0.05 | 0.05 |
| Salt | 2.71 | 2.39 |
| Spray-dried Tobacco Extract | 2.66 | 2.34 |
| MCC Powder from Tobacco | 5.67 | 4.99 |
| Blue Colorant | 0.00 | 0.0002537 |
| Flavorant | 0.46 | 0.40 |

Example 5

A pastille product adapted for use as a substitute for snus is produced using the same general process and formulation set forth in Example 1, except a pharmaceutical grade nicotine composition is used as the tobacco extract component.

Table 6 below shows the dry weight percent of each ingredient in each pastille made according to this procedure, as well as the weight percent of each ingredient at a targeted 12% moisture content level. The weight percentages do not include a 0.2 weight percent Capol® 570C coating applied to the product.

TABLE 6

Final product weight percentages

| Ingredient | Dry Weight Percent | Weight Percent at 12% Moisture Content |
|---|---|---|
| Gum Arabic Powder | 37.05 | 32.61 |
| Cold Water | 0.00 | 12.00 |
| Isomalt Powder | 44.45 | 39.11 |
| Erythritol | 8.55 | 7.52 |
| Maltitol Syrup | 1.87 | 1.65 |
| Glycerin | 2.78 | 2.45 |
| Sucralose | 0.05 | 0.05 |
| Salt | 2.75 | 2.42 |
| Tobacco-derived Nicotine | 2.26 | 1.99 |
| Blue Colorant | 0.00 | 0.0002573 |
| Flavorant | 0.23 | 0.20 |

Example 6

A pastille product adapted for use as a substitute for oral snuff is produced using the same general process and formulation set forth in Example 1, except for addition of lysine and sodium carbonate, which can be added in the same step with the tobacco components.

Table 7 below shows the dry weight percent of each ingredient in each pastille made according to this procedure, as well as the weight percent of each ingredient at a targeted 15% moisture content level.

TABLE 7

Final product weight percentages

| Ingredient | Dry Weight Percent | Weight Percent at 15% Moisture Content |
|---|---|---|
| Gum Arabic Powder | 31.60 | 26.86 |
| Cold Water | 0.00 | 15.00 |
| Isomalt Powder | 35.28 | 29.99 |
| Erythritol | 6.35 | 5.40 |
| Maltitol Syrup | 1.88 | 1.60 |
| Lysine | 0.33 | 0.28 |
| Sodium carbonate | 0.83 | 0.71 |
| Glycerin | 2.65 | 2.25 |
| Sucralose | 0.06 | 0.05 |
| Salt | 7.37 | 6.27 |
| Fire-cured Milled Tobacco | 5.89 | 5.00 |
| Fire-cured Tobacco Spray-dried Extract | 3.08 | 2.62 |
| Caramel Color | 1.40 | 1.19 |
| Licorice Flavorant | 1.17 | 1.00 |
| Additional Flavorant | 1.83 | 1.56 |
| Capol ® 570C | 0.25 | 0.21 |

Example 7

A pastille product adapted for use as a substitute for oral snuff is produced using the same general process and formulation set forth in Example 1, except a pharmaceutical grade nicotine composition is used as the tobacco extract component and the caramel color and licorice flavorant are removed.

Table 8 below shows the dry weight percent of each ingredient in each pastille made according to this procedure, as well as the weight percent of each ingredient at a targeted 8% moisture content level.

TABLE 8

Final product weight percentages

| Ingredient | Dry Weight Percent | Weight Percent at 8% Moisture Content |
|---|---|---|
| Gum Arabic Powder | 33.44 | 30.77 |
| Cold Water | 0.00 | 8.00 |
| Isomalt Powder | 48.63 | 44.74 |
| Erythritol | 7.58 | 6.97 |
| Maltitol Syrup | 1.63 | 1.50 |
| Glycerin | 2.30 | 2.11 |
| Sucralose | 0.01 | 0.01 |
| Salt | 5.40 | 4.97 |
| Tobacco-derived Nicotine | 0.33 | 0.30 |
| Flavorant | 0.57 | 0.53 |
| Capol ® 570C | 0.10 | 0.09 |

Example 8

A pastille product adapted for use as a substitute for oral snuff is produced using the same general process and formulation set forth in Example 1, except a pharmaceutical grade nicotine composition is used as the tobacco extract component and Nutriose® soluble dietary fiber powder (available from Roquette of Lestrem, France) is added.

Table 9 below shows the dry weight percent of each ingredient in each pastille made according to this procedure, as well as the weight percent of each ingredient at a targeted 10% moisture content level.

TABLE 9

Final product weight percentages

| Ingredient | Dry Weight Percent | Weight Percent at 10% Moisture Content |
|---|---|---|
| Gum Arabic Powder | 30.77 | 27.69 |
| Cold Water | 0.00 | 10.00 |
| Isomalt Powder | 41.29 | 37.16 |
| Erythritol | 7.37 | 6.64 |
| Maltitol Syrup | 1.78 | 1.60 |
| Glycerin | 2.04 | 1.84 |
| Sucralose | 0.02 | 0.02 |
| Salt | 5.58 | 5.02 |
| Tobacco-derived Nicotine | 0.33 | 0.30 |
| Nutriose ® Powder | 8.40 | 7.56 |
| Caramel Color | 1.12 | 1.01 |
| Licorice Flavorant | 0.50 | 0.45 |
| Additional Flavorant | 0.68 | 0.61 |
| Capol ® 570C | 0.11 | 0.10 |

Example 9

A pastille product adapted for use as a substitute for oral snuff is produced using the same general process and formulation set forth in Example 1, except the milled tobacco is replaced with milled green tea.

Table 10 below shows the dry weight percent of each ingredient in each pastille made according to this procedure, as well as the weight percent of each ingredient at a targeted 8% moisture content level.

TABLE 10

Final product weight percentages

| Ingredient | Dry Weight Percent | Weight Percent at 8% Moisture Content |
|---|---|---|
| Gum Arabic Powder | 26.13 | 24.04 |
| Cold Water | 0.00 | 8.00 |
| Isomalt Powder | 34.51 | 31.75 |
| Erythritol | 6.76 | 6.22 |
| Maltitol Syrup | 1.63 | 1.50 |
| Glycerin | 2.30 | 2.12 |
| Sucralose | 0.05 | 0.05 |
| Salt | 6.40 | 5.89 |
| Milled Green Tea | 15.17 | 13.96 |
| Fire-cured Tobacco Spray-dried Extract | 4.05 | 3.73 |
| Caramel Color | 1.22 | 1.12 |
| Licorice Flavorant | 0.51 | 0.47 |
| Additional Flavorant | 1.15 | 1.06 |
| Capol ® 570C | 0.10 | 0.09 |

Example 10

A pastille product adapted for use as a substitute for oral snuff is produced using the same general process and formulation set forth in Example 9, except less milled green tea is used.

Table 11 below shows the dry weight percent of each ingredient in each pastille made according to this procedure, as well as the weight percent of each ingredient at a targeted 12% moisture content level.

TABLE 11

Final product weight percentages

| Ingredient | Dry Weight Percent | Weight Percent at 12% Moisture Content |
|---|---|---|
| Gum Arabic Powder | 29.58 | 26.03 |
| Cold Water | 0.00 | 12.00 |
| Isomalt Powder | 39.07 | 34.38 |
| Erythritol | 6.95 | 6.12 |
| Maltitol Syrup | 1.68 | 1.48 |
| Glycerin | 2.36 | 2.08 |
| Sucralose | 0.05 | 0.04 |
| Salt | 6.58 | 5.79 |
| Milled Green Tea | 6.49 | 5.71 |
| Fire-cured Tobacco Spray-dried Extract | 4.16 | 3.66 |
| Caramel Color | 1.26 | 1.11 |
| Licorice Flavorant | 0.53 | 0.46 |
| Additional Flavorant | 1.18 | 1.04 |
| Capol ® 570C | 0.11 | 0.10 |

Example 11

A pastille product adapted for use as a substitute for snus is produced using the same general process and formulation set forth in Example 5, except the erythritol was removed and replaced with additional isomalt.

Example 12

A pastille product adapted for use as a substitute for snus is produced using the same general process and formulation set forth in Example 5, except from 1 to 5 dry weight percent of a honeybush extract is added. The isomalt and gum arabic components are reduced proportionately as a result.

The honeybush extract is prepared by steeping honeybush powder in a 10 part water to 1 part honeybush (by weight) slurry for about 10 minutes at a temperature of about 180° F. (about 82° C.). After steeping, the liquid extract is filtered through cheesecloth and the extraction process is repeated on the remaining pulp. The combined liquid extract is concentrated by evaporative drying and freeze-dried to form a powder.

Example 13

A pastille product adapted for use as a substitute for snus is produced using the same general process and formulation set forth in Example 5, except from 1 to 5 dry weight percent of a green rooibos extract is added. The isomalt and gum arabic components are reduced proportionately as a result.

The green rooibos extract is prepared by steeping green rooibos powder in a 10 part water to 1 part rooibos (by weight) slurry for about 10 minutes at a temperature of about 180° F. (about 82° C.). After steeping, the liquid extract is filtered through cheesecloth and the extraction process is repeated on the remaining pulp. The combined liquid extract is concentrated by evaporative drying and freeze-dried to form a powder.

Example 14

A pastille product adapted for use as a substitute for snus is produced using the same general process and formulation set forth in Example 13, except from 1 to 5 dry weight percent of a red (fermented) rooibos extract is added. The isomalt and gum arabic components are reduced proportionately as a result.

Example 15

A pastille product adapted for use as a substitute for snus is produced using the same general process and formulation set forth in Example 5, except from 5 to 10 dry weight percent of a milled red (fermented) honeybush powder (less than about 50 micron average particle size) is added. The milled honeybush powder is formed by grinding shredded honeybush leaves to the desired particle size. The isomalt and gum arabic components are reduced proportionately as a result.

Example 16

A pastille product adapted for use as a substitute for snus is produced using the same general process and formulation set forth in Example 5, except from 5 to 10 dry weight percent of a milled green rooibos powder (less than about 50 micron average particle size) is added. The milled rooibos powder is formed by grinding shredded rooibos leaves to the desired particle size. The isomalt and gum arabic components are reduced proportionately as a result.

Example 17

A pastille product adapted for use as a substitute for oral snuff is produced using the same general process and formulation set forth in Example 1, except about 4 dry weight percent of milled rosemary powder (less than about 50 micron average particle size) is added to the product. The milled rosemary powder is formed by grinding shredded rosemary leaves to the desired particle size. The isomalt and gum arabic components are reduced proportionately as a result.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A pastille configured for insertion into the mouth of a user, the pastille comprising:
   (i) a nicotinic compound and/or a non-tobacco botanical material;
   (ii) at least one natural gum binder present in an amount of at least about 25 dry weight percent; and
   (iii) a plurality of sugar alcohols present in a total amount of at least about 40 dry weight percent,
   wherein the shape of the pastille is moldable in the oral cavity and wherein the pastille does not comprise a particulate tobacco material.

2. The pastille of claim 1, wherein the nicotinic compound is present in an amount of about 0.1 to about 10 dry weight percent, based on the total dry weight of the pastille.

3. The pastille of claim 1, wherein the nicotinic component is pharmaceutical grade nicotine.

4. The pastille of claim 1, wherein the nicotinic compound is a compound selected from the group consisting of nicotine base, nicotine hydrochloride, nicotine dihydrochloride, nicotine monotartrate, nicotine bitartrate, nicotine sulfate, nicotine zinc chloride, nicotine salicylate, and combinations thereof.

5. The pastille of claim 1, wherein the nicotinic compound comprises nicotine in a free base form.

6. The pastille of claim 1, wherein at least a portion of the nicotinic compound is sorbed on a carrier.

7. The pastille of claim 6, wherein the carrier is microcrystalline cellulose.

8. The pastille of claim 1, wherein the non-tobacco botanical material is present in an amount of at least about 5 dry weight percent, based on the total dry weight of the pastille.

9. The pastille of claim 1, wherein the non-tobacco botanical material is in the form of a particulate material having an average particle size of less than about 50 microns.

10. The pastille of claim 1, wherein the non-tobacco botanical material is in the form of an extract.

11. The pastille of claim 1, wherein the non-tobacco botanical material is selected from the group consisting of acai berry, alfalfa, allspice, annatto seed, apricot oil, basil, bee balm, wild bergamot, black pepper, blueberries, borage seed oil, bugleweed, cacao, calamus root, catnip, catuaba, cayenne pepper, chaga mushroom, chervil, cinnamon, dark chocolate, potato peel, grape seed, ginseng, gingko biloba, Saint John's Wort, saw palmetto, green tea, black tea, black cohosh, cayenne, chamomile, cloves, cocoa powder, cranberry, dandelion, grapefruit, honeybush, echinacea, garlic, evening primrose, feverfew, ginger, goldenseal, hawthorn, hibiscus flower, jiaogulan, kava, lavender, licorice, marjoram, milk thistle, mints (menthe), oolong tea, beet root, orange, oregano, papaya, pennyroyal, peppermint, red clover, rooibos (red or green), rosehip, rosemary, sage, clary sage, savory, spearmint, spirulina, slippery elm bark, sorghum bran hi-tannin, sorghum grain hi-tannin, sumac bran, comfrey leaf and root, goji berries, gutu kola, thyme, turmeric, uva ursi, valerian, wild yam root, wintergreen, yacon root, yellow dock, yerba mate, yerba santa, *Bacopa monniera, Withania somnifera, Silybum marianum*, and combinations thereof.

12. The pastille of claim 1, wherein the non-tobacco botanical component is selected from the group consisting of rosemary, oregano, sage, hibiscus, clove, rose hip, yerba mate, cocoa, turmeric, guayusa, honeybush, green tea, black tea, rooibos, and combinations thereof.

13. The pastille of claim 1, wherein the natural gum binder is selected from the group consisting of gum arabic, xanthan gum, guar gum, ghatti gum, gum tragacanth, karaya gum, locust bean gum, gellan gum, and combinations thereof.

14. The pastille of claim 1, wherein the natural gum binder is present in an amount of about 25 to about 40 dry weight percent.

15. The pastille of claim 1, wherein the plurality of sugar alcohols comprise one or more sugar alcohols selected from the group consisting of erythritol, arabitol, ribitol, isomalt, polyglycitol, maltitol, dulcitol, iditol, mannitol, xylitol, lactitol, sorbitol, and combinations thereof.

16. The pastille of claim 15, wherein the predominant component of the plurality of sugar alcohols is isomalt or erythritol.

17. The pastille of claim 1, further comprising one or more additional components selected from the group consisting of flavorants, sweeteners, additional binders, emulsifiers, disintegration aids, humectants, colorants, buffering agents, and mixtures thereof.

18. The pastille of claim 1, further comprising one or both of a sweetener and a humectant.

19. The pastille of claim 18, wherein the sweetener is sucralose and the humectant is glycerin.

20. The pastille of claim 1, wherein the pastille has an outer coating coated thereon, and wherein the pastille is starch-moulded.

* * * * *